INVENTOR.
CECIL A. CRAFTS
BY
Mead, Browne, Schuyler & Beveridge
ATTORNEYS

Nov. 19, 1963 C. A. CRAFTS 3,111,625

METHOD FOR PHASE OR FREQUENCY DEMODULATION

Filed Dec. 29, 1961 3 Sheets-Sheet 2

*INVENTOR.*
CECIL A. CRAFTS

*BY*
Mead, Browne, Schuyler & Beveridge
*ATTORNEYS*

METHOD FOR PHASE OR FREQUENCY DEMODULATION

Filed Dec. 29, 1961 3 Sheets-Sheet 3

INVENTOR.
CECIL A. CRAFTS
BY
Mead, Browne, Schuyler & Beveridge
ATTORNEYS

United States Patent Office 3,111,625

Patented Nov. 19, 1963

3,111,625

METHOD FOR PHASE OR FREQUENCY DEMODULATION

Cecil A. Crafts, Santa Ana, Calif., assignor to Robertshaw Controls Company, a corporation of Delaware Filed Dec. 29, 1961, Ser. No. 163,160
13 Claims. (Cl. 325—349)

This invention relates to communication by continuous radio waves modulated to digitally impress upon the carrier information in the form of discrete pulse length, or degrees of phase or frequency modulation of the carrier wave frequency. More particularly, it relates to coherent demodulation or recovery at the receiver of the information impressed upon the carrier, providing an output wave form which duplicates that impressed upon the carrier at the transmitter, regardless of whether the carrier was phase or frequency modulated.

A number of schemes for modulating and demodulating frequency modulated waves are well known. Generally, as in broadcasting, such modulation has been in the form of continuous changes in frequency which have varied in amount from zero to some maximum frequency change which is controlled generally by the band width which may be transmitted. Other communication systems have employed a keyed frequency shift or digital type of modulation in which the degree of modulation of the carrier wave is varied in one or more discrete steps, requiring less band width, and only the limited number of bits of information so transmitted are to be recovered from such a system in contrast to broadcast reception which is of the continuously varying type. Because of the well known fact that such transmissions may be reliably received under more difficult conditions of atmospheric irregularities, interference, and weak signal conditions, or when a number of frequencies are to be transmitted at the same time on a wire system, a digital or stepped type of frequency or phase shift modulation may be received with greater certainty.

Under present conditions of crowded airways or crowded frequency allotments for the purpose of communications it has become important to utilize ways of transmitting more information in smaller band widths of the transmitted spectrum. For use on radio circuits digital modulation has assumed increasing importance and particularly digital phase modulation, which requires less band width for a particular transmission rate than is required by a corresponding frequency modulation system. It has, therefore, become important to devise new means for employing extremely narrow band widths of the transmitted spectrum in each channel, thereby permitting many channels of information to be simultaneously employed all within the band which would otherwise be required for a single channel of information employing more conventional methods of modulation.

A number of previous methods for demodulating phase or frequency modulated signals have been employed which have generally either been rather complicated in the apparatus at the transmitting and receiving ends of the system or have required the transmission of a reference frequency simultaneously with the modulated wave, or when phase modulation is employed, a reference signal which may be compared at the receiving station with the instantaneous phase of the carrier wave. Recovery of the modulating signal employed at the transmitter in a simple and direct manner at the receiver alternatively without regard to the form of modulation transmitted have generally not been available, and simple demodulation apparatus has not generally been available in sufficiently reliable form.

It is an object of the present invention to provide a simple and direct method of developing in a receiver an output wave wihch corresponds to the wave form employed at the transmitter regardless of whether such modulating signal was of the phase shift or frequency shift type, or combinations thereof.

A further object of the invention is to provide a control signal for generating automatically at a receiver a wave form corresponding closely to the wave form used to modulate the wave transmitted.

A still further object of the invention is to provide an improved phase comparison method and apparatus for comparing the phase at one instant in a transmitted signal with the phase transmitted at a later instant.

A still further object of the invention is to provide in the receiver apparatus for converting a control signal corresponding to a difference in phase at two instants of transmission into an output signal of square wave type, whether or not the transmitted signal had been modulated by a square wave, a triangular wave, or some combination thereof.

It is also an object of the invention to provide an improved method and apparatus for synchronizing a locally generated signal with a transmitted signal, both in phase and frequency.

In order to achieve these objects a residual error signal is developed having a magnitude proportional to the instantaneous phase difference between the received wave and a local oscillator wave, the local oscillator wave being continuously corrected by this error signal, which is also utilized as the receiver output to indicate the information transmitted.

Other objects and advantages of the invention will be more clearly apparent as the description proceeds in connection with the drawings in which.

Figure 1:
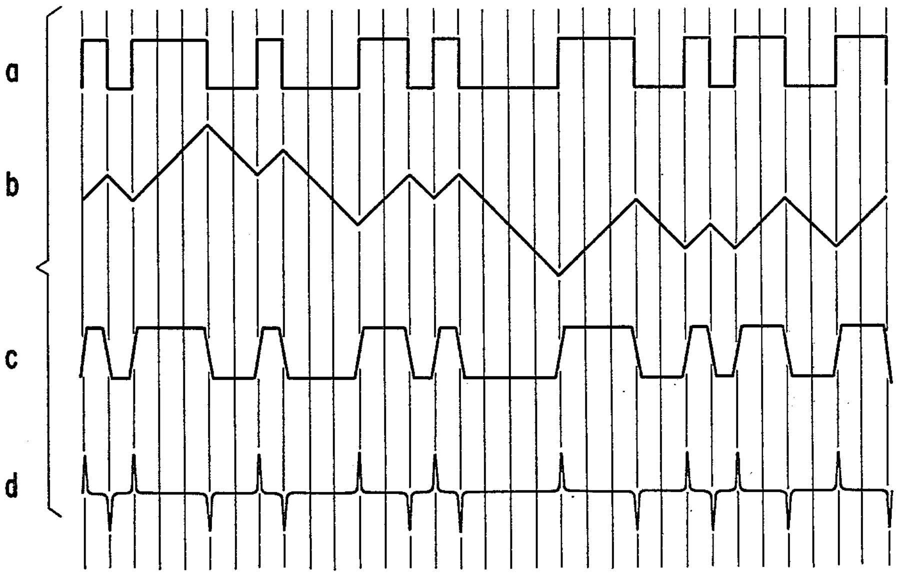
FIG. 1 illustrates four generally equivalent forms of modulating wave which might be applied to a transmitted wave.

Referring now to FIG. 1, there is shown at 1*a* a square wave modulation signal containing thirty-two bits of information which might be impressed upon a carrier wave in the form of frequency shift modulation. There is shown at 1*b* the same group of thirty-two bits of information in the form of slope line modulation to show the phase modulation of the same carrier as in 1*a* to produce the identical frequency shifted output wave. Shown at 1*c* there is a modulation signal having partly the characteristics of the square wave at 1*a* and partly the characteristics of the triangular wave of 1*b* which could, of course, be considered as a triangular wave with positive and negative peaks limited, or as a square wave in which the rise and fall is not precisely abrupt as at 1*a*, and which might be either a phase or frequency modulation signal. At 1*d* there is shown a wave form consisting of positive and negative spikes corresponding to the rise and fall of the wave form in 1*a*. While 1*d* represents essentially the differential of 1*a*, 1*b* represents the integral of 1*a*. It is well known that a carrier wave step-modulated in frequency as by the wave 1*a* produces the same carrier modulation as triangular wave phase modulation by wave 1*b* and that if a carrier frequency were phase modulated by the wave 1*a*, the same result would be obtained by frequency modulating by wave 1*d*. It is convenient in transmission of digital information to utilize information in the square wave form, by integration or differentiation as required. This relationship will be made use of in the output of the demodulator according to the method of this invention to obtain a wave in the form desired to correspond to that which was used in transmission.

Figure 2:
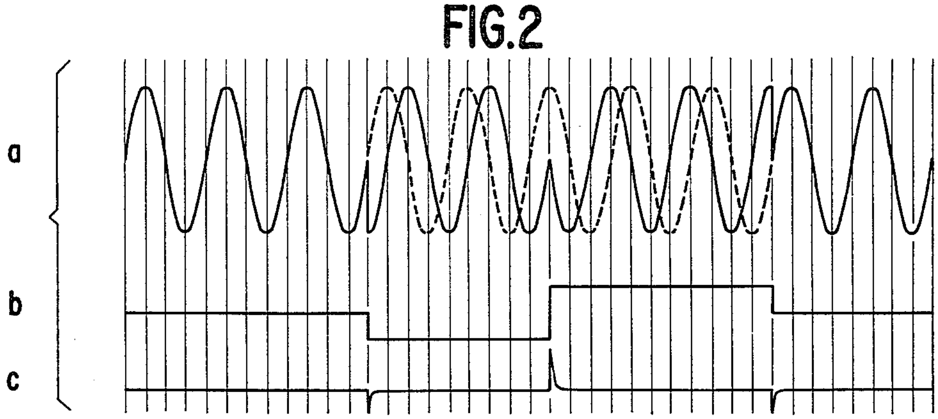
FIG. 2 illustrates a transmitted sine wave step-phase modulated to convey information bits, also illustrating the square wave phase modulation signal producing it and the equivalent frequency modulating signal producing the same transmitted wave.

In FIG. 2, 2*a* represents a continuous carrier frequency digitally phase modulated by a keying procedure. While it is illustrated as being shifted 90°, retarded and advanced, respectively, there are advantages in employing 120° steps or 72° steps and the showing in FIG. 2 is by way of illustration only. The curve 2*b* represents the keying wave form for equal positive and negative phase shifts of varying duration to produce carrier 2*a*. Wave form 2*c* represents substantially the derivative of 2*b* except that the positive going double step in 2*b* is represented as of double amplitude to show a double shift. Thus, whether the wave in 2*a* is phase modulated by wave 2*b* or frequency modulated by wave 2*c*, the dotted line positions of the wave in 8*a* correspond to the unmodulated wave whereas the accompanying solid line positions at the same part of the curve present the two illustrated degrees of modulation.

Figure 3:
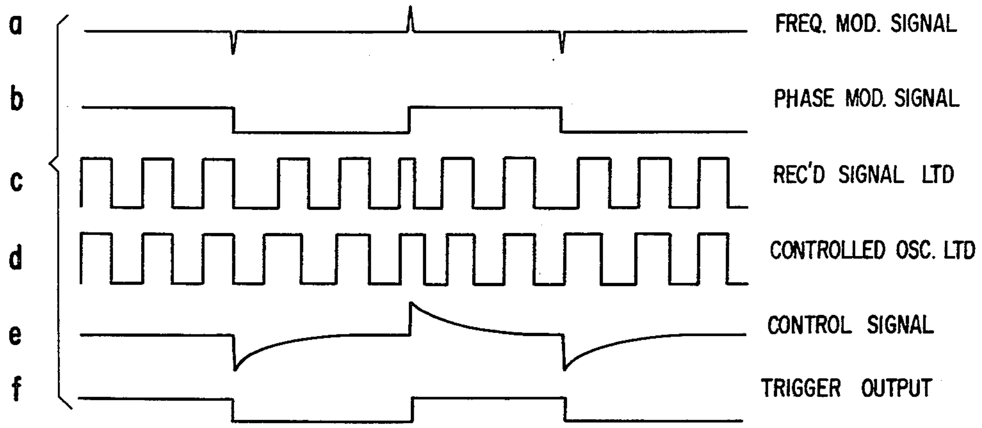
FIG. 3 illustrates the wave forms at a receiver according to the present invention resulting from a transmitted wave modulated by keyed phase shifts (3*b*) as in FIG. 2.
Figures 6, 6A:
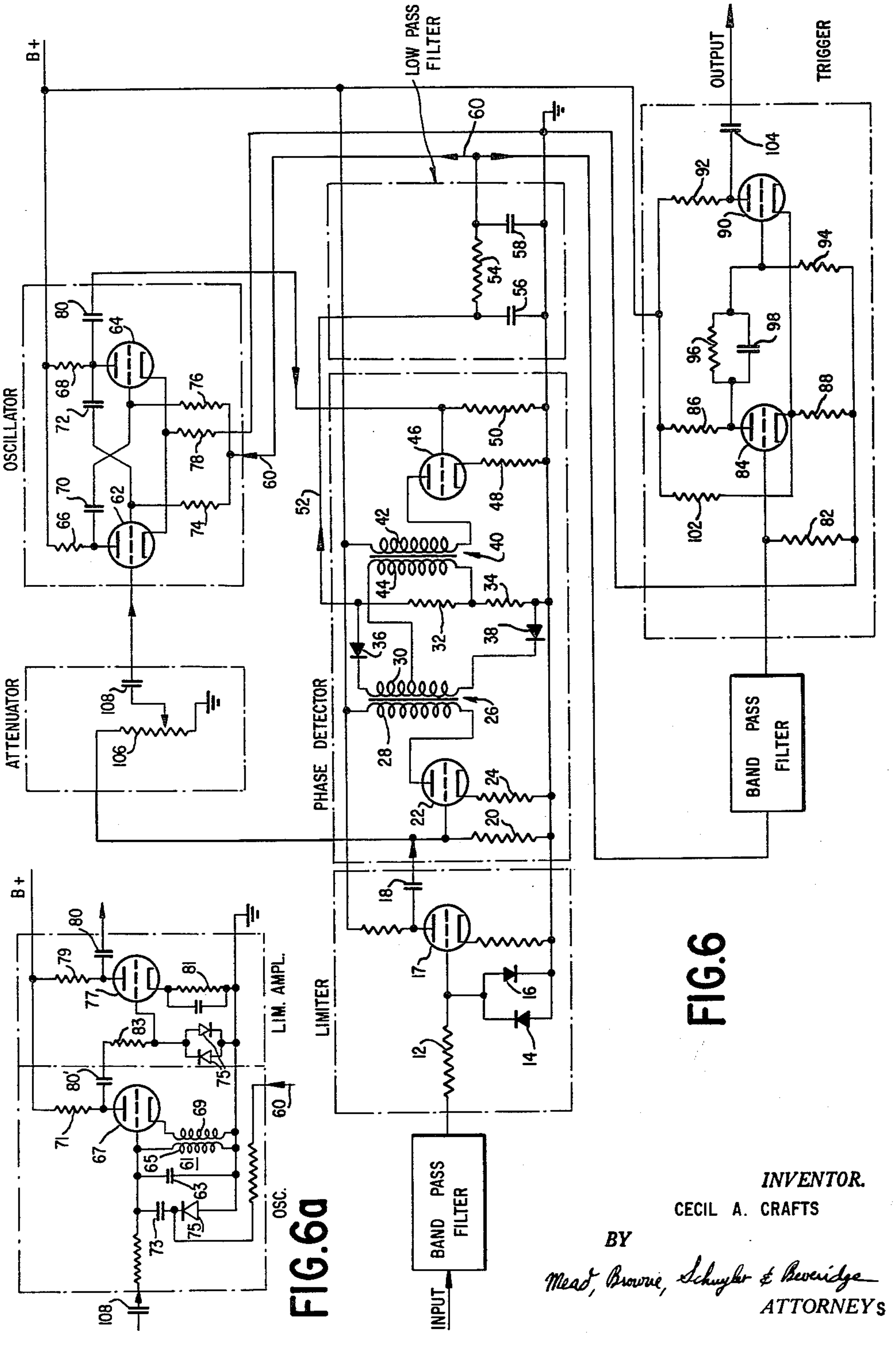
FIG. 6 is a schematic wiring diagram of one form of apparatus to perform demodulation according to the present invention.
FIG. 6*a* shows schematically the employment of an L–C oscillator in lieu of the multivibrator of FIG. 6, including an optional limiting output stage.

In FIG. 3 there is illustrated a square wave type of phase modulation at 3*b*, with the equivalent spike wave frequency modulation at 3*a*. At 3*c* there is shown a wave corresponding to the transmitted wave at 2*a*, after it has been modified at the receiver by amplification and limiting, according to well known methods, to produce a square wave wherein the phase modulation shows as variations in the time of occurrence and duration of successive portions of the square wave. At 3*d* there is shown the voltage output of a local oscillator and limiter automatically controlled to follow that wave form illustrated at 3*c*, but in which a lag occurs at each abrupt change in the modulation wave, while 3*e* represents a discrepancy between wave 3*c* and 3*d* occurring at the instant of a change in 3*c* prior to the time when 3*d* has been brought into synchronism with 3*c*. The means by which this is accomplished will be described hereinafter. It is important to note that the local oscillator need not be followed by a limting stage as illustrated in FIG. 6*a*, and that the wave form 3*d* would in that case be sinusoidal, which can be phase compared in the same manner as the wave form shown. The squared form of local oscillator output appears to have some advantage in linearity of detected signal and thus is illustrated and described here as a preferable mode of operation. It will be apparent that plural step digital modulation signals are received and detected with somewhat different resulting wave forms. The positive and negative phase shift of FIG. 2 also result in slightly different forms of error signal and of trigger output, requiring somewhat different processing therebeyond, details of utilization being illustrated in, for example, copending application Serial Number 64,-856, filed October 25, 1960, by Cecil A. Crafts et al.

Figure 4:
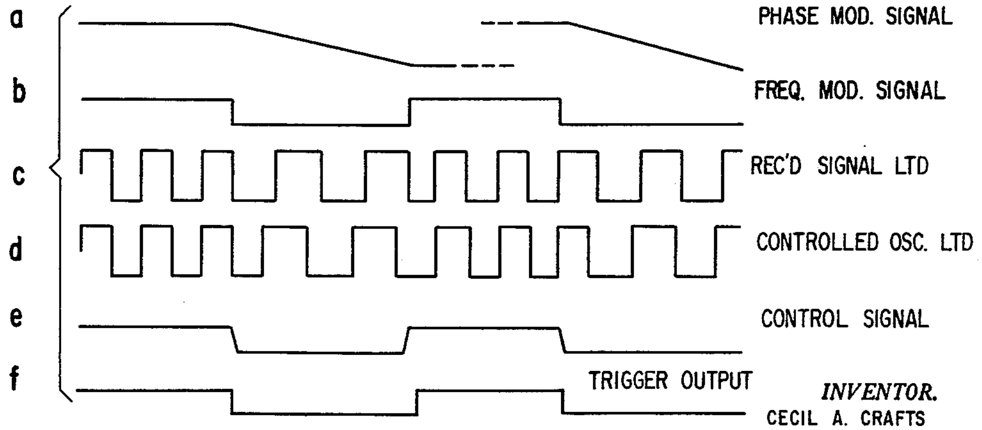
FIG. 4 illustrates wave forms developed at the receiver in accordance with the present invention resulting from a transmitted wave modulated by keyed frequency changes (4*b*)

In FIG. 4 there is represented a square wave modulating signal 4*b* similar to that in FIGS. 2 and 3 except that in this case it is applied as a frequency modulating signal, usually conforming to alternatively transmitted fixed frequencies within narrow band limits. FIG. 4*a* is the corresponding phase modulating signal, for two intervals of altered frequency, being the integral of 4*b*. The resulting received wave form is illustrated at 4*c* after limiting in the same manner as in wave form 3*c*.

Likewise, wave form 4*d* represents the automatic following of wave form 4*c* by the local oscillator and limiter constructed and controlled according to this invention, wherein it is noted that the wave 4*d* has a phase lagging 4*c* when the frequency is altered from normal. Wave form 4*e* represents the instantaneous discrepancy between the received and limited wave form 4*c*, and the locally generated oscillator signal, after phase and frequency correction by the control voltage, represented in wave form 4*d*. While for most purposes it may be desirable to use a frequency $f_0$ as a "space" signal, and *f*, as a "mark," it is equally possible to demodulate continuous frequency variations, or positive and negative shifts as are illustratively shown in FIG. 2.

In FIGS. 3 and 4, the wave form *e*, will be seen to represent a residual error signal derived from the comparison of phase between an incoming signal at the receiver and the output of an oscillator made to automatically adjust itself into phase synchronism with the incoming signal. According to this invention, the wave forms 3*e* and 4*e* are not the difference between a steady running oscillator and a received signal, but instead are the instantaneous differences in phase between the local oscillator and the received signal while the local oscillator is being forced into synchronism by a developed control voltage proportional to that phase difference instantly remaining. A suddenly shifted phase, therefore, results in a transient wave form abruptly appearing as the frequency is suddenly changed as at 3*a* and the local oscillator runs out of step with the received wave. The displacement in the curve 3*e* quickly returns to zero as the oscillator adjusts through a new transient frequency sufficient to correct the phase as in 3*a* and the phase difference is eliminated. However, when the frequency, rather than phase is keyed, as in FIG. 4, the phase of the locally generated wave remains continuously behind the phase of the received wave because the latter has an unaltered normal running frequency, requiring continuous correction to keep it in step with some different received frequency. Accordingly, the discrepancy in phase between wave forms 4*c* and 4*d* continues despite the operation of the correcting circuitry under influence of the error signal. Wave forms 3*f* and 4*f* illustrate outputs from the demodulator after conversion to square wave form for keyed phase and keyed frequency modulation, respectively.

It will be understood that the intense competition for available band space in either closed loop communications or the radio frequency spectrum, requires that each channel must be confined to the narrowest possible frequency limits, while at the same time transmitting the greatest possible amount of information in each frequency band. In the very low frequencies there is the additional reason that it is inconvenient to construct transmitting and receiving antennas having sufficient size to obtain reasonable radiation efficiencies and at the same time accommodate a band width compatible with various types of modulation requiring broad bands. The band widths required at any frequency may be reduced in modulation by binary code wave form, which consists essentially of modulated and unmodulated portions of the wave transmitted, the modulations being impressed thereon at alternate intervals. If the transmitted wave is to be frequency modulated, for example, this frequency modulation consists of the sending of a second frequency differing from the fundamental frequency of the transmitted wave, and the transmitter and receiver must be able to handle both frequencies with equal facility. Conservation of band width requires that this frequency be as little changed from the unmodulated carrier frequency as possible. In a binary code signalling device one may use either a shift of frequency or a phase shift, and the only information transmitted is whether or not the shift has occurred. However, the duration of the changed phase or frequency may represent the digits of a digital communication system. This information may be in the form of pulse widths, pulse position, or pulse repetition rate, or combinations thereof, and a digital communication system may be constructed accordingly without the use of an additional band width in the spectrum. Thus, a wave form such as 1*a* is not all in one binary code form but contains additional information. In order to make use of such information new techniques are required, for which FIGS. 5 and 6 represent diagrammatically and schematically one form of equipment according to the present invention.

Figure 5:
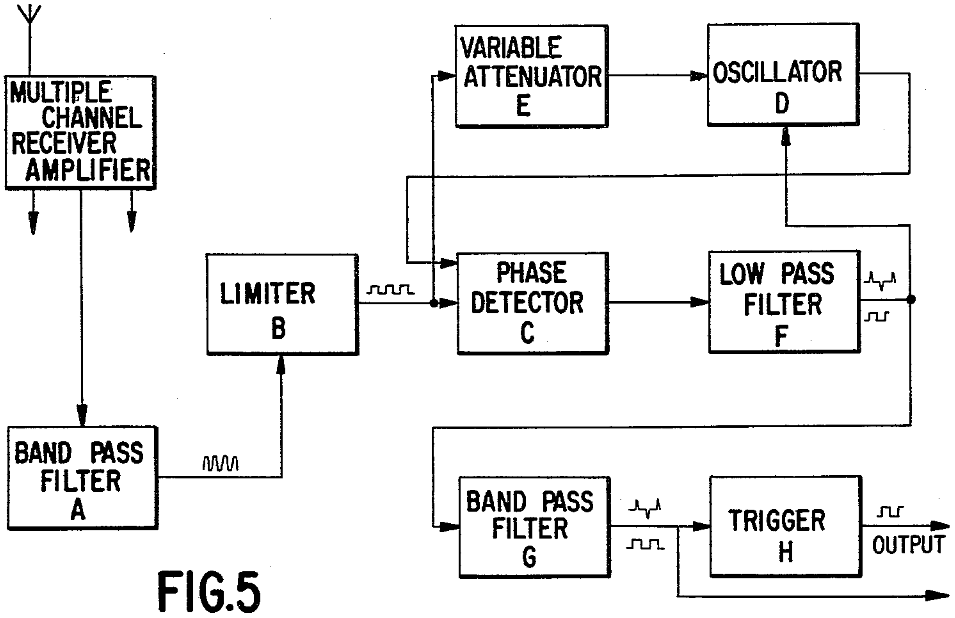
FIG. 5 is a block diagram illustrating the method of demodulation according to the present invention.

The antenna for such a system may receive several channels as indicated in FIG. 5, or may be suitably designed and adjusted to the frequency of concern. When received the signal may or may not first be amplified but especially in narrow band communications the received wave may be separated into channels by a band pass filter shown in FIG. 5 at A. This filter might, for example, separate an incoming wave centered at one thousand cycles from other incoming waves centered one hundred cycles either side thereof. Accordingly, the band pass filter A is designed to have sharp rejection of signals outside the pass band. Having selected the band of frequencies of concern, the signal is passed through a limiter stage shown at B in FIG. 5. This stage may include amplification of conventional type, of which one is illustrated in FIG. 6. The limiter stage preferably consists of a coupling resistor 12 connecting the band pass filter to a pair of oppositely poled diode elements 14 and 16 parallel connected from the resistor 12 to ground. As is well known in the art, such a pair of diodes limits both positive and negative excursions of signal voltage to very small values which are constant within the half cycles. An amplifier tube 17 may be employed to steepen the curve connecting these small positive and negative signal excursions, thereby to produce conventional squared waves diagrammatically illustrated at the output of limiter B. The output will normally be coupled by a capacitor as at 18 to the next stage.

The coupler 18 is connected to provide the input to a phase detector C. The function of the phase detector is to compare two phases and produce an output proportional to the difference in phase between the two inputs. A conventional form of such a phase detector as shown in FIG. 6 consists of an amplifier tube 22 connected in the usual fashion having a grid thereof connected to the coupler 18 with a grid-to-ground resistor 20 and a cathode-to-ground resistor 24. The anode of the tube 22 is connected to a positive voltage supply through one winding of a transformer 26 of which the primary 28 connects the tube anode to the positive voltage supply. The secondary of the transformer 26 shown at 30 is center-tapped, and the two end terminals thereof are connected across two equal resistors 32 and 34 by way of oppositely poled diode elements 36 and 38 arranged one in each lead from the winding 30. Any sine wave or similar output from the transformer 26 results in zero voltage across the resistors 32 and 34. Between the center tap of the winding 30 and the junction of the resistors 32 and 34, there is arranged an output winding of a further transformer 40 having a primary winding 42 and a secondary winding 44. The output of the transformer 40, therefore, is impressed across the longitudinal axis of a bridge of which resistors 32 and 34 form the output legs and of which the halves of winding 30, each with its series-connected diode, are the input legs. As is well known in the art, such a phase detector produces an output only when voltage is impressed by winding 44 upon the longitudinal axis of this bridge.

In order that the magnitudes of the signals impressed across the bridge by the winding 44 and that passed from winding 30 through diodes 36 and 38 may be compatible and may be adjusted to the purpose intended, there is normally provided an amplifying tube 46 having a cathode connected to ground by resistor 48 and an anode connected by way of the primary winding 42 of the transformer 40 to the positive voltage supply. The grid at the tube 46 is supplied with signal from some source whereof the phase is to be compared with that of a signal supplied from tube 22, the grid of tube 46 being connected to ground by resistor 50. By suitable adjustment of resistors 20 and 24, and of resistors 48 and 50, the relative magnitudes of the signals in the comparator bridge applied by windings 30 and 44 may be adjusted. One terminal of the bridge resistor 34 is connected to ground whereas one terminal of resistor 32 at the opposite point of the bridge is a suitable output connection to serve as the output of the comparator bridge.

Such a phase comparator bridge has been considered a frequency discriminator and is effective both for frequency and phase detection under the stated conditions. While the phase detector may be of a different form than that illustrated, the output taken at 52 will be seen to contain a voltage which represents the instant difference in phase between the signal at the grids of tubes 22 and 46. Inasmuch as exact adjustments of inputs may not be conveniently maintained, the output at 52 will also normally contain small portions of signal passed across opposite diagonals of the phase detector bridge. Harmonics associated with transients will also be present. For these reasons, it is desirable to filter the output when it is desired to have an output which represents only the instantaneous phase difference in the two inputs to the bridge. There is accordingly illustrated in FIG. 5 low pass filter F so designed as to pass the phase discrepancy signal without appreciable attenuation while eliminating the higher frequency residual signals from either input to the phase detector bridge. As illustrated in FIG. 6, the low pass filter may consist of an impedance element 54 connected to the output of the phase detector at 52 and having capacitors 56 and 58 connected, respectively, to the two ends of impedance element 54 and to ground. The end of the element 54 opposite the connection to the detector is connected as the output 60 of the low pass filter, and contains the voltage representing any phase angle discrepancy between the two inputs of the phase detector.

According to the present invention the output voltage from the low pass filter is employed to adjust the phase of the input to the tube 46. Thus, the locally generated signal, which is to be compared with the input signal after limiting, is a complex controlled function of the output of the phase detector, which is controlled by its own output. The output of the low pass filter F thus represents a differentiated form of the input signal. It may be regarded as an error signal when the local oscillator is looked upon as a generator of a signal controlled to synchronize itself with the incoming signal.

Oscillator D provides a locally generated signal for comparison with the incoming signal and may have an output comparable to the limited signal at coupler 18. While several forms of oscillator might be used, the one illustrated in FIG. 6 is effective to produce wave forms as illustrated in FIGS. 3 and 4 having the requisite linear response in frequency to the phase error signal applied thereto. The multivibrator type of oscillator provides well understood outputs which clearly show the operative principles of the invention for purposes of description, and includes among its features a fixed oscillation time, variable as controlled by the output at 60. An alternative form of oscillator is shown at FIG. 6*a*, which may be used with or without a limiting stage in place of the astable multivibrator, as hereinafter described. This multivibrator comprises tubes 62 and 64 having anodes respectively connected to a positive voltage supply through resistors 66 and 68, the anodes being respectively cross-coupled to the control grids each of the other through capacitors 70 and 72, the grids being further connected through like resistors 74 and 76 to a common junction which is connected to the output of low pass filter F. The oscillator tubes have cathodes joined together and connected to the ground through a resistor 78. So connected, the oscillator appears as a conventional multivibrator of the free running type having no stable rest position and having equal times of conduction for each of the tubes 62 and 64, determined by capacitors 70 and 72 and resistors 74 and 76.

The phase-following action results from connecting the common junction of the resistors 74 and 76 not to ground, as would be customary for such a free running multivibrator, but instead to a voltage source which is itself variable, i.e., the output of the low pass filter F. Thus, there is applied mutually to the tubes 62 and 64 a bias control modifying the conduction time of the two tubes in proportion to the voltage impressed on the common junction of resistors 74 and 76. The local oscillator is, therefore, made to oscillate at a frequency which is fixed, when no error signal is imposed thereon, by virtue of the common junction of resistors 74 and 76 being connected to ground through resistors 54, 32 and 34. However, in the presence of a signal, either of positive or negative sign, the oscillator period will be increased or decreased with approximate linearity in accordance with the sign of that voltage. The output of the oscillator may be taken from the anode of either tube 66 or 68 via capacitor 80 which is connected to the grid of tube 46 supplying thereto a locally generated signal whose frequency is adjusted to agreement with the frequency of the square wave supplied to the tube 22.

In FIG. 6*a* there is shown an L-C oscillator having highly desirable flywheel action to maintain a steady operating time in the absence, momentarily, of any incoming signal, which in the case of the multivibrator might tend to inadvertently alter the running time. A tank circuit 61 consists of capacitor 63 and inductor 65, parallel-connected to the grid of amplifier tube 67 and to ground. Coil 69 couples coil 65 in positive feed-back relation to tube 67, being connected between ground and the cathode. The anode is connected by load impedance 71 to a voltage supply. The oscillation timing is controlled by the signal at 60, being applied between fixed capacitor 73 and a voltage-varied capacitor 75, capacitors 73 and 75 being in parallel with capacitor 63 thereby to control the tank circuit. Other voltage-sensitive reactances could be connected in control of the oscillation time. Tube 67 has an output coupled at 80′ to tube 46 or may have a limiting and amplifying stage connected thereto. The oscillator 61 has a sinusoidal output which may be squared by impressing the output from 80′ upon resistor 83 which is connected to ground through oppositely poled, parallel-connected diodes 75, the junction of diodes 75 with resistor 83 being the limited wave output. Suitable amplification, if required, occurs in tube 77 having its grid connected to the junction of diode 75 and resistor 83, its anode connected through load impedance 79 to a voltage supply, and a cathode grounded through a suitable bias circuit 81. The output at the anode is connected to the transformer 40 via capacitor 80, and tube 46 if the additional amplification is required. Further details of a flywheel circuit and its connection to the phase detector circuit are described in my Patent No. 2,991,354, for Automatic Frequency Control for Phase Shift Keying Communication Systems, issued July 4, 1961.

Since the detector bridge compares phases and produces an error signal at 60 corresponding to a phase difference, this error signal will tend to cause just sufficient frequency change in the output at capacitor 80 to restore the phase thereof to agreement with the phase of the received signal. It will be noted that this signal remains positive so long as the phase of the incoming signal at 60 continues to lead that of the locally generated signal and that the oscillator phase will lag the received signal so long as the required oscillator frequency is above the designed normal. The situation for a phase modulated carrier differs in that a square wave phase modulation permits the local oscillator to adjust itself in phase to correspondence with the incoming signal and the control voltage supplied via 60 to the local oscillator consists of positive and negative spikes in accordance with whether the frequency output of the oscillator must be increased or decreased to correct the phase thereof to correspond with that of the incoming signal. It will be appreciated that this result is obtained by virtue of the combination of inputs to the phase detector bridge, the first of which is the incoming signal as amplified and limited, and the second of which is a complex result both of the natural oscillator frequency and of the discerpancy between the phase thereof and the phase of the incoming wave. By applying a voltage proportional to instantaneous phase discrepancy as an error signal to correct the instantaneous frequency of the oscillator, the output of the phase detector is itself modified to correspond to the changes of phase occurring in the received signal. Since this is essentially the derivative of the information signal which has modulated the wave in the communication channel, it is only necessary to purge this phase detector output of unwanted and spurious components and to put the output voltage in a form convenient for utilization.

The low pass filter F is designed with suitable values of capacity and resistance to eliminate spurious output voltages passed by the phase detector, which are primarily at and above the received frequency. The filter F is placed in the output of the phase detector prior to supply of the error voltage to the oscillator in order that the oscillator will not respond to residual components of the carrier wave. There may remain, in the error or control voltage, certain undesired components which are not removed by the low pass filter or which may become enhanced by the feedback action described, and which may be eliminated by a suitably designed band pass filter illustrated at G. This band pass filter may be of any well known type, preferably, however, of the type referred to as a matched filter designed to pass a particular wave form more efficiently than other wave forms. Such filters are of commercial design of which a different one would be selected for filtering the output when in the form of positive and negative spikes as illustrated in FIG. 5 than would be selected if the output were of the square wave type. Regardless of the type of filtering employed, the essential wave form pertinent to the modulation frequency is applied as the control voltage for the oscillator and is made available as an output for the phase demodulator.

As previously mentioned, the control voltage applied to the oscillator is essentially a differentiated form of the modulation curve impressed upon the carrier wave at the transmitter. It may be feasible to employ this output directly for the recording of any information digitally impressed upon the carrier wave, depending upon the form of the modulating wave and whether the carrier is phase or frequency modulated. It is normal, however, to integrate the differentiated form of the modulated wave in order that the demodulation output wave form will be similar to that used at the transmitter, which will generally be keyed in square wave form whether modulation is of frequency or phase. To secure a square wave output it is only necessary to generate a square wave corresponding to the positive and negative going spikes of the control voltage and this may be done by a conventional trigger circuit.

One form of such a trigger circuit, illustrated in FIG. 6, has been generally referred to as a Schmitt trigger. While various other integrating circuits and other forms of trigger circuit might be employed for this purpose, the preferred form employs an input connection from filter G to the grid of tube 84 with grid resistor 82 connected thereto and to ground, the tube having an anode supplied through a resistor 86 from a positive voltage supply and a cathode connected via a cathode resistor 88 to ground. A second tube 90, like the tube 84, has an anode connected to the positive voltage supply through resistor 92 while the cathode thereof is connected to the cathode of tube 84 and grounded through common cathode resistor 88. The grid of tube 90 is connected to ground via resistor 94 and to the anode of tube 84 via resistor 96 which has capacitor 98 thereacross. Bias for the tubes 84 and 90 is supplied by way of a resistor 102 between the positive voltage supply and the mutual cathode connection of tubes 84 and 90, the ratio of resistance 88 and 102 determining the negative bias for the tubes. Output from the trigger circuit is taken via capacitor 104 connected to the anode of tube 90. When so connected, the trigger circuit constitutes a bistable multivibrator triggered by input to the tube 84 from its first stable condition and retriggered to that same condition upon the occurrence of a signal of opposite sign at the grid of tube 84. The result is a square wave output having a positive portion between each positive excursion of control voltage and the succeeding negative excursion thereof, and having a negative excursion between each negative spike and the succeeding positive spike.

There may also be employed an initial synchronizing voltage for bringing the receiver oscillator into coincidence with the transmitter frequency and phase. A portion of the square wave output of the limiter may be selected and applied via resistor 106 and capacitor 108 to the grid of tube 62 to control the oscillator in the event that the natural running period should vary from time to time because of tube changes, temperature variations and other unbalancing factors. Application of such an initial voltage is optional. It can be adjusted to any desired fraction of the control of oscillator frequency, or it may be omitted entirely because of its tendency to slightly modify the output voltage from the low pass filter. Because of the effective negative feedback characteristics of the circuit including the oscillator and phase detector, considerable signal may be passed through the attenuator E, circuit 106, 108, without overriding the effect of the control voltage in line 60.

It will be appreciated that the demodulator described may under some circumstances have wave forms which are not illustrated in FIG. 5, and might be of the square wave type, or some immediate type, as the control voltage is impressed upon the local oscillator. If, for example, the control voltage is of the square wave type, the output of the receiver might be taken from the input of the trigger circuit H rather than from its output. There is, accordingly, shown in FIG. 5 an alternative output. Such alternative output is unnecessary, however, since a square wave output, if obtained from G, remains the same as output from H. It will be appreciated by those skilled in the art that the transmitter might be transmitting square wave digitally modulated carrier waves modulated either in frequency or in phase and that the demodulator described has as its output a square wave suitable for recording digitally related information whether the input wave at the transmitter is of the spike, square wave, or triangular wave form and is adapted for use with combinations of these forms.

While a method of phase demodulation or frequency demodulation herein described is illustrated with respect to particular embodiments, it will be obvious to those skilled in the art that many other forms of apparatus may be employed at the option of the user without departing from the spirit and scope of this invention as defined by the following claims.

What I claim is:

1. The method of demodulation of a digitally phase modulated wave which comprises receiving said wave, converting said received wave to square wave form, generating a local wave of the same frequency, comparing for each cycle the phases of said waves, phase modulating each cycle of said local wave in proportion to instantaneous differences detected and in a direction to equalize the phase of said received and local waves; and developing a demodulation output signal proportional to said difference for each cycle.

2. The method of demodulation of a phase modulated wave comprising, receiving said wave, converting said wave to modulated square wave form, generating a local square wave of the same frequency, modulating said local wave with a signal derived from the instantaneous difference of phase in each of the corresponding cycles of said local and received waves, comparing said received wave with said modulated local wave, and integrating said instantaneous derived signal.

3. The method of demodulation of a received phase modulated electromagnetic wave comprising, converting said wave to square wave form, generating a square wave of the same frequency, comparing in a phase detector bridge the instantaneous phases of each cycle of said generated and received square waves; developing a voltage proportional to the instant difference between said phases at each cycle, employing said voltage linearly to vary the period of the generated wave in a sense to correct said detected difference, and integrating said developed voltage during said correction.

4. The method of synchronizing a locally generated wave with a received digitally phase modulated wave comprising, converting the received wave to square wave form, generating a said local wave partially synchronized to the same frequency by said square wave, comparing the times of occurrence of individual voltage excursions in said received and local waves, and applying a voltage proportional to the time lag of each cycle of said local wave to control the time of the next succeeding excursions thereof in the direction to eliminate said lag.

5. The method of recovery at a receiver of digital information employed as a modulating signal to step modulate a transmitted voltage wave comprising, receiving said modulated wave, limiting said wave to produce square wave components, generating a corresponding local wave synchronized in average phase with said modulated wave, limiting said local wave, taking the differential of said modulating signal by comparison of said squared received wave and said generated wave and applying said differential to synchronize the phase of the next cycle of local wave to that of the received wave, and integrating the resultant differential signal employed for said cycle synchronization.

6. A detector for developing from a received electromagnetic wave a digitally stepped signal comprising, receiving means for said wave, limiter means converting said wave to square wave form, a square wave generator triggered in phase at the frequency of said wave, means responsive to both said square waves detecting as a proportional direct current voltage individual differences in phase therebetween at each cycle, means including a suppressor for said square waves connected to receive and apply said voltage to control the instantaneous period of said generator proportionally to said voltage, and means extracting from the output of said detecting means said applied voltage in digitally stepped signal form.

7. A digital modulation signal detector comprising, means receiving narrowly confined frequencies of radio energy, means converting said received energy to square waves, means generating local square waves of the received frequency partially synchronized in phase by said square waves, means linearly controlling the duration of generated square waves according to an applied voltage, means comparing the phase of each excursion of said generated and received square waves to produce an output voltage proportioned to the instantaneous phase difference therebetween, said voltage being applied to actuate said controlling means, and means extracting from said comparing means a voltage proportional to said detected instanetaneous phase difference during control thereby of said generated frequency as a detector output.

8. A digital signal demodulator comprising, means receiving substantially a unitary frequency of radio energy, means converting said energy to square waves, means locally generating similar square waves initially synchronized by first said square waves, means synchronizing phases of said received and locally generated square waves at each cycle including phase comparator means and voltage control means governing the cyclic duration of output of the local generating means, said synchronizing means employing each instantaneous phase discrepancy as said duration governing means, and means developing an integrated wave proportional to said discrepancy after said cyclic duration control as a demodulator output.

9. A digital signal demodulator comprising, means receiving substantially single frequencies of phase modulated communication waves, means converting said waves to squared form, means responsive to said converted waves generating similar local squared waves of the same frequency, means comparing the phase of each squared local and received wave and developing a voltage proportional to instant initiation time variances therebetween, means applying said voltage to control the duration of the locally generated wave in opposition to the phase difference voltage, and means applying the residual said voltage in integrated form as the output for said demodulator.

10. A phase synchronizing device for a digital electromagnetic wave communication system employing one transmission frequency comprising, means receiving said wave limited to squared form, means locally producing a similar square wave of said frequency, each cycle being initiated in response to said received wave, means comparing instantaneous phases of said received and local waves and applying a voltage proportional to the difference therebetween within each cycle to control the duration of the locally generated cycle while said phase difference exists.

11. A demodulator for a wave digitally modulated in frequency or phase comprising, receiving means converting said wave to digitally modulated square wave form, means generating a local square wave in the form of the unmodulated received wave, means modulating said local wave to approximate agreement with said received wave including voltage control of the cyclic duration of said local wave, means detecting during each cycle variation in phase between said locally generated and received square waves and applying detected said differences as said voltage in control of the local wave cyclic duration, and means sampling and integrating said control voltage as an output of said demodulator.

12. A demodulator for modulated electromagnetic waves recovering in square wave form digital information impressed thereon either by square waves of phase or of frequency, comprising, a band pass filter, a limiter, a square wave oscillator gated at the band pass frequency, a phase detector connected to receive said limiter output and said oscillator output and generate a voltage proportional to the instant deviations of phase therebetween, means applying said generated voltage to proportionally change the phase of the oscillator output, low pass filter means removing from said generated voltage components at said band pass frequency, and trigger means generating a square wave voltage output from said generated voltage digitally corresponding to said information impressed on said waves either as phase or frequency modulations.

13. In a phase and frequency modulation communication system a receiver comprising, means to receive and limit an electromagnetic wave to form square wave components, an astable multivibrator energized and adjusted to produce a square wave component of the frequency received, means in said multivibrator controlling said frequency in proportion to variations of voltage applied thereto, means initially synchronizing said multivibrator with said received wave, means including a phase detector bridge having a pair of input arms energized from said received square wave components, as diagonal input energized by the output of said multivibrator and output arms energized in response to phase differences between said inputs, low pass filter means removing from said output components at the frequency of said square wave components, means connecting said low pass filtered output in control of first said means, and means including a trigger circuit for transforming said control voltage corresponding to said phase differences into square wave form corresponding to the modulation applied to said electromagnetic wave.

References Cited in the file of this patent

UNITED STATES PATENTS

| | | |
|---|---|---|
| 2,332,540 | Travis | Oct. 26, 1943 |
| 2,871,349 | Shapiro | Jan. 27, 1959 |
| 2,911,528 | McRae | Nov. 3, 1959 |
| 3,028,487 | Losee | Apr. 3, 1962 |